(12) United States Patent
Wang (10) Patent No.: US 12,484,729 B2
(45) Date of Patent: Dec. 2, 2025

(54) CARPET AND MANUFACTURING METHOD THEREOF

(71) Applicant: Yueheng Wang, Tianjin (CN)

(72) Inventor: Yueheng Wang, Tianjin (CN)

(*) Notice: Subject to any disclaimer, the term of this patent is extended or adjusted under 35 U.S.C. 154(b) by 0 days.

(21) Appl. No.: 18/923,889

(22) Filed: Oct. 23, 2024

(65) Prior Publication Data
US 2025/0280983 A1  Sep. 11, 2025

(30) Foreign Application Priority Data

Mar. 6, 2024 (CN) .......................... 202420429107.7

(51) Int. Cl.
| | | |
|---|---|---|
| *A47G 27/02* | (2006.01) | |
| *B32B 5/02* | (2006.01) | |
| *B32B 7/12* | (2006.01) | |
| *B32B 25/10* | (2006.01) | |
| *B32B 25/14* | (2006.01) | |

(52) U.S. Cl.
CPC ............ *A47G 27/0281* (2013.01); *B32B 5/02* (2013.01); *B32B 5/022* (2013.01); *B32B 7/12* (2013.01); *B32B 25/10* (2013.01); *B32B 25/14* (2013.01); *B32B 2262/02* (2013.01); *B32B 2262/08* (2013.01); *B32B 2307/7376* (2023.05); *B32B 2307/744* (2013.01); *B32B 2471/02* (2013.01)

(58) Field of Classification Search
CPC ....................................................... D06C 11/00

USPC ............................................................ 428/91
See application file for complete search history.

(56) References Cited

U.S. PATENT DOCUMENTS

| | | | | |
|---|---|---|---|---|
| 5,637,398 | A  * | 6/1997 | Araki ....................... | D06P 3/522 528/307 |
| 6,774,067 | B2 * | 8/2004 | Demott .................... | B32B 27/36 428/95 |
| 8,057,885 | B2 * | 11/2011 | Goyarts ................ | D06M 17/10 264/157 |
| 2019/0010658 | A1 * | 1/2019 | Rees ......................... | B32B 5/28 |

OTHER PUBLICATIONS

Dictionary of Textiles. "Waterproof Definition" 2003 (Year: 2003).*

* cited by examiner

*Primary Examiner* — Jenna L Johnson
(74) *Attorney, Agent, or Firm* — HOWARD M COHN and Associates, LLC (57) ABSTRACT

A carpet and a manufacturing method thereof are provided. The carpet includes a top layer, a felt filling layer, a bottom layer, and an anti-slip rubber layer. The felt filling layer is connected to a bottom surface of the top layer. The bottom layer is connected to a bottom surface of the felt filling layer. The anti-slip rubber layer is connected to a bottom surface of the bottom layer. An edge of the top layer is connected to an edge of the bottom layer to fix the felt filling layer between the top layer and the bottom layer. The carpet is allowed to be easily folded to save space and facilitate transportation and storage. A user is able to wash the carpet by a washing machine or by hand as needed.

13 Claims, 8 Drawing Sheets

CARPET AND MANUFACTURING METHOD THEREOF

TECHNICAL FIELD

The present disclosure relates to a technical field of carpets, and in particular to a carpet and a manufacturing method thereof.

BACKGROUND

Carpets are used in various places, such as living spaces, commercial places and public places. Carpets protect floor decoration materials very well and have rich patterns and gorgeous colors, which decorate the environment very well. Moreover, after laying a carpet, a friction between the carpet and the floor is large, and people are not easy to slip when walking on the carpet. Furthermore, the carpets further play a role in isolating sound waves. However, a conventional carpet is generally made from hard materials, is not easy to fold at will, and is not convenient to move, resulting in a large space occupied during transportation and movement. In addition, anti-slip performance of the conventional carpet is average. As people walk, a position of the conventional carpet may shift, affecting a laying effect. In addition, the conventional carpet does not have a waterproof function. After the floor is cleaned, residual water may penetrate into the conventional carpet placed on the floor, which is easy to cause the conventional carpet to mold.

SUMMARY

The present disclosure provides a carpet and a manufacturing method thereof. The carpet is easy to fold, saves space, and is easy to transport and store. Moreover, users are allowed to clean the carpet by machine washing or hand washing as needed In a first aspect, the present disclosure provides the carpet. The carpet comprises a top layer, a felt filling layer, a bottom layer, and an anti-slip rubber layer. The felt filling layer is connected to a bottom surface of the top layer. The bottom layer is connected to a bottom surface of the felt filling layer. The anti-slip rubber layer is connected to a bottom surface of the bottom layer. An edge of the top layer is connected to an edge of the bottom layer to fix the felt filling layer between the top layer and the bottom layer.

In some embodiments, the top layer is configured as a high-temperature-resistant material. A pattern layer is disposed on the top layer. The pattern layer is formed on an upper surface of the top layer by thermal transfer printing.

In some embodiments, fluff is disposed on the upper surface of the top layer, and at least part of the pattern layer is disposed on the fluff.

In some embodiments, the top layer is made from any one or any combination of polyester, polypropylene, chinlon, and acrylic fiber; and/or the felt filling layer is made from any one or any combination of wool, rabbit hair, horse hair, camel hair, chemical fiber, artificial felt, plant fiber, and animal leather felt; and/or the bottom layer is made from any one of a blended chemical fiber fabric, cotton, and a chemical fiber fabric.

In some embodiments, pores of the top layer are not greater than 2 mm.

In some embodiments, the carpet further comprises a first adhesive layer disposed between the top layer and the felt filling layer, and the first adhesive layer is configured to bond the top layer and the felt filling layer.

In some embodiments, pores of the bottom layer are not greater than 2 mm.

In some embodiments, the carpet further comprises a second adhesive layer disposed between the felt filling layer and the bottom layer, and the second adhesive layer is configured to bond the top layer and the felt filling layer.

In some embodiments, at least one of the first adhesive layer and the second adhesive layer is polyolefin composite adhesive.

In some embodiments, a thickness of at least one of the first adhesive layer and the second adhesive layer is not less than 2 mm and not greater than 5 mm.

In some embodiments, the anti-slip rubber layer is made from thermoplastic rubber (TPR).

In some embodiments, an anti-slip pattern is disposed on a bottom surface of the anti-slip rubber layer.

In some embodiments, the anti-slip pattern comprises any one or any combination of a triangular topological structure, a dot-shaped anti-slip pattern, a strip-shaped anti-slip pattern, a grid-shaped anti-slip pattern, a concave texture, and a convex texture.

In some embodiments, a thickness of the anti-slip rubber layer is not less than 2 mm and not greater than 5 mm.

In the carpet of the present disclosure, the top layer makes the carpet surface have good wear resistance, has an ability to resist wear and tear during daily use and cleaning, and prolongs service life of the carpet. The felt filling layer is able to buffer an impact of people walking on the carpet and also plays a certain role in heat preservation, which reduces cold air from the floor. The edge of the top layer is connected to the edge of the bottom layer, so that the felt filling layer is fixed between the top layer and the bottom layer. By such design, overall stability of the carpe is enhanced, which prevents the carpet from curling, warping or shifting during use and ensures that the carpet always remains flat and beautiful when being laid on the floor. The felt filling layer is firmly fixed between the top layer and the bottom layer, so that the carpet is not easily deformed and damaged when subjected to external forces.

In addition, the anti-slip rubber layer is disposed on the bottom surface of the bottom layer. The anti-slip rubber layer increases a friction between the carpet and the floor, so as to prevent the carpet from sliding, which reduces a risk of falling when the user walks or moves on the carpet, thereby improving safety of use. Furthermore, the anti-slip rubber layer has a certain waterproof function, which separate moisture on the floor from the carpet, thereby preventing the carpet from getting moldy due to the moisture. The felt filling layer makes the carpet softer and being easily folded to save space and facilitate transportation and storage. The user is allowed to wash the carpet by a washing machine or by hand as needed.

In a second aspect, the present disclosure provides a manufacturing method of a carpet. The carpet comprises a top layer, a felt filling layer, a bottom layer, and an anti-slip adhesive layer. The manufacturing method comprises steps:
  coating a polyolefin composite adhesive on a bottom surface of the top layer and/or a top surface of the felt filling layer, and pressing the top layer and the felt filling layer together by a laminating machine;
  coating the polyolefin composite adhesive on a bottom surface of the felt filling layer and/or a top surface of the bottom layer, and pressing the felt filling layer and the bottom layer together by the laminating machine; and coating TPR on a bottom surface of the bottom layer, and pressing an anti-slip pattern on a bottom surface of the anti-slip rubber layer by the laminating machine.

The felt filling layer is connected to the bottom surface of the top layer. The bottom layer is connected to the bottom surface of the felt filling layer. The anti-slip rubber layer is connected to the bottom surface of the bottom layer.

In some embodiments, a pattern layer is formed on an upper surface of the top layer by thermal transfer printing.

In some embodiments, the top layer and the bottom layer are overlocked to fix the felt filling layer between the top layer and the bottom layer.

In some embodiments, the step of coating the polyolefin composite adhesive on the bottom surface of the top layer and/or the top surface of the felt filling layer comprises:

when the polyolefin composite adhesive is only coated on the bottom surface of the top layer or the top surface of the felt filling layer, enabling a first adhesive amount thereof being not less than 30 g/m$^2$ (gram/square meter) and not greater than 50 g/m$^2$; and when the polyolefin composite adhesive is coated on both of the bottom surface of the top layer and the top surface of the felt filling layer, enabling a second adhesive amount thereof being not less than 15 g/m$^2$ and not greater than 25 g/m$^2$.

In some embodiments, the step of coating the polyolefin composite adhesive on the bottom surface of the felt filling layer and/or the top surface of the bottom layer comprises:

when the polyolefin composite adhesive is only coated on the bottom surface of the felt filling layer or the top surface of the bottom layer, enabling a third adhesive amount thereof being not less than 30 g/m$^2$ and not greater than 50 g/m$^2$; and when the polyolefin composite adhesive is coated on both of the bottom surface of the felt filling layer or the top surface of the bottom layer, enabling a fourth adhesive amount thereof being not less than 15 g/m$^2$ and not greater than 25 g/m$^2$.

In some embodiments, a first adhesive layer is formed between the top layer and the felt filling layer, a second adhesive layer is formed between the felt filling layer and the bottom layer, and a thickness of the first adhesive layer and a thickness of the second adhesive layer are not less than 2 mm and not greater than 5 mm.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

REFERENCE NUMBERS IN THE DRAWINGS

1. Carpet; 10. Surface layer; 20. Felt filling layer; 30. Bottom layer; 40. Anti-slip rubber layer; 41. Anti-slip pattern; 50. First adhesive layer; 60. Second adhesive layer.

Realization of purposes, functional features, and advantages of the present disclosure is further explained in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. Unless otherwise indicated, the term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

As shown in FIGS. 1-4, embodiments of the present disclosure provides a carpet 1. The carpet 1 comprises a top layer 10, a felt filling layer 20, a bottom layer 30, and an anti-slip rubber layer 40. The felt filling layer 20 is connected to a bottom surface of the top layer 10. The bottom layer 30 is connected to a bottom surface of the felt filling layer 20. The anti-slip rubber layer 40 is connected to a bottom surface of the bottom layer 30.

The top layer 10 is made from any one or any combination of polyester, polypropylene, chinlon, and acrylic fiber. Optionally, the top layer 10 is made from modified heat-resistant polyester, and modification methods thereof may comprise copolymerization modification, cross-linking modification, and adding heat-resistant additives.

For example, basic raw materials of polyester are terephthalic acid (TPA) and ethylene glycol (EG). During the copolymerization process, at least one third monomer is added. The at least one third monomer is, for example, but not limited to, isophthalic acid (IPA) and sulfonate monomers. Under high temperature and in a presence of a catalyst, the TPA and the EG first undergo an esterification reaction to generate oligomers such as ethylene terephthalate (BHET). On the basis of the esterification reaction, the at least one third monomer is added to a reaction system and undergoes a polycondensation reaction together with oligomers such as the BHET. During a polycondensation process, monomer molecules are connected into polymer chains by removing small molecules (such as water or alcohol). Due to the addition of the at least one third monomer, a final polymer chain contains both structural units of BHET and the structural units of the third monomer, thereby forming a copolymer. The addition of the at least one third monomer change the kinetics and thermodynamic behavior of the polymerization reaction, including reaction rate, molecular weight distribution, copolymer sequence structure, etc., thereby improving heat resistance, wear resistance, and antistatic properties of the polyester.

The cross-linking modification comprises chemical cross-linking modification and physical cross-linking modification. The chemical cross-linking modification is to introduce a cross-linking agent during a manufacturing of the polyester. The cross-linking agent reacts with active groups on polyester molecular chains to form chemical bonds. The chemical bonds tightly connect the polyester molecular chains together to form a network structure. The cross-linking agent comprises but is not limited to aldehydes, amides, isocyanates, etc. The physical cross-linking modification comprises radiation cross-linking or heat treatment cross-linking. The radiation cross-linking uses of high-energy rays such as ultraviolet rays and electron beams to irradiate the polyester. During an irradiation process, the polyester molecular chains are broken and redisposed by energy of the high-energy rays to form new cross-linking points. The radiation cross-linking is simple to operate, highly efficient, does not require the addition of the cross-linking agent, and has low cost. The heat treatment cross-linking is to perform heat treatment on the polyester under high temperature, causing the polyester molecular chains to undergo thermal motion and approach each other, the thus casing cross-linking reaction.

After heat-resistant polyester material is prepared, the heat-resistant polyester material is washed, dried, granulated, and threaded to obtain polyester yarn. The polyester yarn is woven into polyester cloth, and then the polyester cloth is cut according to a size of the carpet required to obtain the top layer 10 of the carpet 1. The top layer 10 may be blended only by the polyester yarn, or the polyester yarn can be blended with yarns of other materials such as cotton yarn and nylon yarn to obtain the top layer 10.

Furthermore, the top layer 10 comprises a pattern layer disposed thereon. Since the top layer 10 of the present disclosure is made from the heat-resistant material, the pattern layer is formed on an upper surface of the top layer 10 by thermal transfer printing. In this way, the pattern layer is quickly printed according to needs of the user. Compared with a conventional dyed yarn weaving method, printing efficiency of the pattern layer of the present disclosure is high, which saves labor costs. In particular, for users with a small minimum order quantity, even small-scale production or personalized customization can achieve high-quality printing of at least one pattern of the carpet (i.e., the pattern layer). In addition, by thermal transfer printing, the at least one patterns, that is colorful and detailed, forming the pattern layer are produced, and the at least one pattern has good durability on the top layer 10 of the carpet 1, and is not easy to fade or wear. Further, fluff that is fine is pulled out on surfaces of the polyester threads during or after a weaving process of the top layer 10, so that the top layer 10 defines a suede. Then the pattern layer is printed on the suede of the top layer 10. The suede makes the pattern layer more layered visually, and enhances an overall three-dimensional sense and texture of the at least one pattern of the pattern layer. Moreover, the suede provides more attachment points for the pattern layer, so that the at least one pattern is more firmly adhered to the top layer 10 of the carpet 1 and is not easy to fall off or wear. The suede further absorbs and reflects light, making the color of the pattern layer more vivid and full, and enhancing the color expression and visual impact.

In order to improve waterproof performance of the top layer 10 of the carpet 1, pores of the top layer 10 are not greater than 2 mm. When in use, liquid stains are unable to immediately penetrate into the carpet 1 after contacting the top layer 10 of the carpet 1, but stay on the upper surface of the top layer 10, and the liquid stains may slowly enter the top layer 10 after 30-60seconds. Such design of the top layer 10 provides the user with enough time to take cleaning measures on the top layer 10, such as using a wet cloth or paper towel to quickly absorb the liquid stains, thereby effectively reducing damage caused by the liquid stains to the carpet 1. In addition, since the liquid stains are not easy to penetrate, the difficulty and frequency of cleaning the carpet 1 are greatly reduced. Not only does it save labor costs, but it also reduces energy consumption and water consumption caused by frequent washing.

Figure 3:
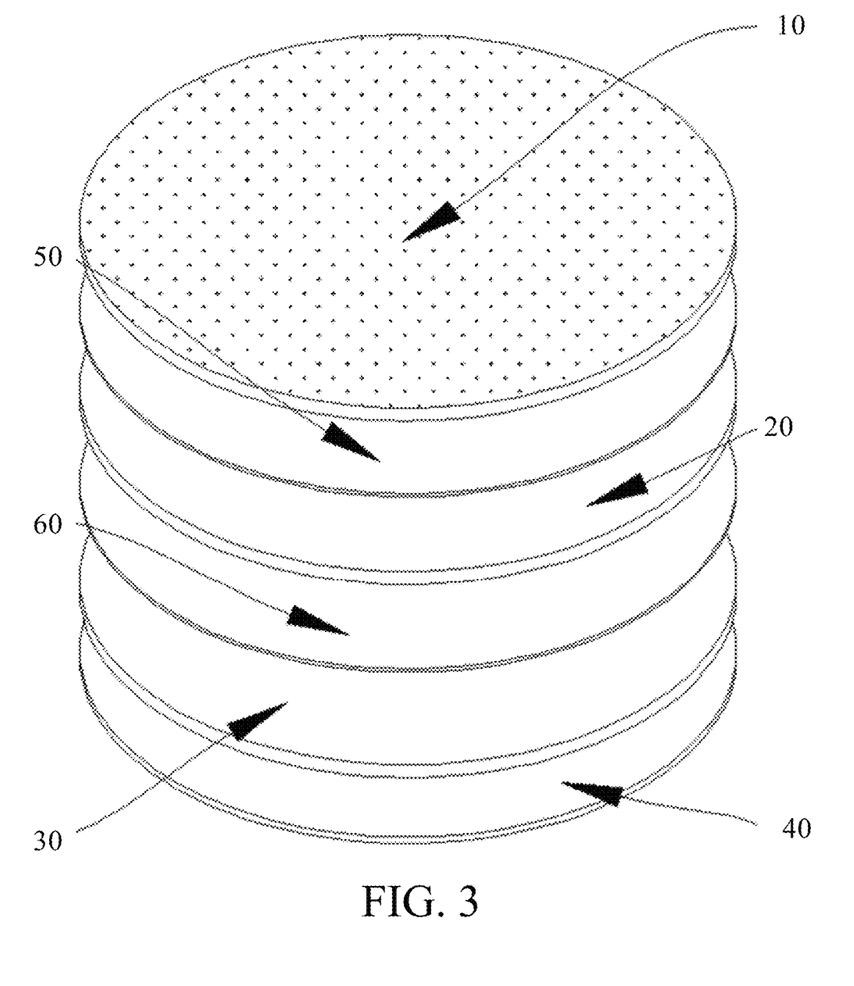
FIG. 3 is an exploded schematic diagram of the carpet according to one embodiment of the present disclosure.
Figure 4:
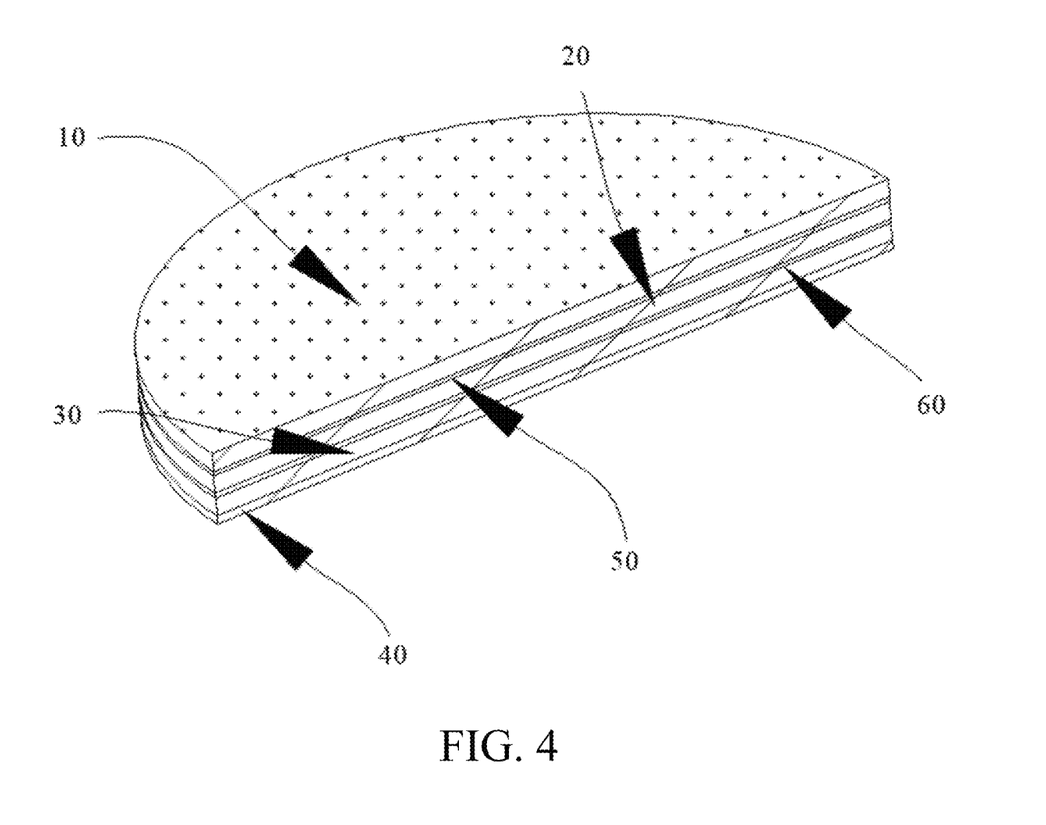
FIG. 4 is a cross-sectional schematic diagram of the carpet according to one embodiment of the present disclosure.

The felt filling layer 20 is made from any one or any combination of wool, rabbit hair, horse hair, camel hair, chemical fiber, artificial felt, plant fiber, and animal leather felt. The wool has good warmth retention and breathability. The rabbit hair has good softness and warmth retention. The horse hair is relatively coarse and hard, but the horse hair also has good warmth retention and certain wear resistance. The camel hair has excellent warmth retention and wear resistance. The chemical fiber is made from synthetic fibers (such as polyester fiber, polypropylene fiber, etc.). The chemical fiber is low cost, easy processing, wear resistance, and not easy to deform.

In some embodiments, the felt filling layer 20 is a non-woven felt made from a mixture of discarded clothes, discarded chemical fibers, and discarded textiles. Since raw materials of the non-woven felt contain a variety of textile fibers, the non-woven felt formed after recycling, cleaning, crushing, and multiple times of rolling has excellent softness. The softness of the non-woven felt enables the non-woven felt to provide better comfort and touch when used as the felt filling layer 20.

A structure of the non-woven felt is relatively tight and uniform, and the non-woven felt is not easy to produce obvious creases due to external forces, so that the non-woven felt is able to maintain a good appearance when used as the felt filling layer 20, which prolongs the service life of the carpet 1. In addition, the discarded clothes, the discarded chemical fibers, and the discarded textiles, which may have become environmental burdens, are recycled and converted into the non-woven felt that is useful, realizing multiple uses of waste. Such treatment method not only reduces a demand for landfill and incineration, but also saves material resources.

The bottom layer 30 is made from any one of a blended chemical fiber fabric, cotton, and a chemical fiber fabric. The blended chemical fiber fabric is made by mixing and weaving two or more chemical fibers. The blended chemical fiber fabric combines advantages of two or more chemical fibers, such as wear resistance, wrinkle resistance, elasticity, etc., and has certain air permeability and hygroscopicity. When the bottom layer 30 is made from the blended chemical fiber fabric, the bottom layer 30 has good support and durability while maintaining a certain degree of comfort. The cotton has excellent air permeability, hygroscopicity, and softness. When the bottom layer 30 is made from the cotton, the bottom layer 30 is able to provide excellent comfort and skin-friendly feeling, which is suitable for the carpet with high requirements for air permeability. The chemical fiber fabric such as polyester fiber, nylon, etc. has excellent wear resistance, wrinkle resistance, and easy cleaning properties.

In order to facilitate a fixation of the top layer 10 and the felt filling layer 20, the carpet 1 further includes a first adhesive layer 50. The first adhesive layer 50 is disposed between the top layer 10 and the felt filling layer 20 to bond the top layer 10 and the felt filling layer 20. The carpet 1 further includes a second adhesive layer 60. The second adhesive layer 60 is disposed between the felt filling layer 20 and the bottom layer 30 to bond the top layer 10 and the felt filling layer 20. The first adhesive layer 50 and the second adhesive layer 60 improve an overall structural strength of the carpet 1 and ensure that layers of the carpet 1 are not separated from each other during use, thereby prolonging the service life of the carpet 1.

A thickness of the first adhesive layer 50 and a thickness of the second adhesive layer 60 are not less than 2 mm and not greater than 5 mm. For example, a thickness of the anti-slip rubber layer 40 is designed to be 2 mm, 3 mm, 4 mm, or 5 mm, etc., which effectively ensures bonding strengths of the first adhesive layer 50 and the second adhesive layer 60. In addition, the first adhesive layer 50 and the second adhesive layer 60 are polyolefin composite adhesive. Specifically, a-olefins such as ethylene, propylene, 1-butene, and 1-pentene are polymerized or copolymerized to obtain thermoplastic resins. Then, the thermoplastic resin is served as a matrix, and auxiliary materials such as modifiers and stabilizers are added to react under high temperature and high pressure to prepare the polyolefin composite adhesive. The polyolefin composite adhesive have excellent adhesion, light color, and is able to quickly cured at room temperature.

Furthermore, pores of the bottom layer 30 are not greater than 2 mm. An adhesive may penetrate into the pores of the bottom layer 30, making contact between the second bonding adhesive layer 60 and the bottom layer 30 tighter and firmer, forming a stronger mechanical engaged effect, and improving a physical connection strength between the bottom layer 30 and the felt filling layer 20. Moreover, when the adhesive is not cured, the adhesive can penetrate into the pores of the bottom layer 30, and then the adhesive is cured to form the second bonding adhesive layer 60, which is conducive to forming a more uniform and dense bonding surface on the bottom surface of the bottom layer 30, thereby improving a bonding force between the anti-slip rubber layer 40 and the bottom layer 30, and thus improving stability of a connection between the anti-slip rubber layer 40 and the bottom layer 30.

The anti-slip rubber layer 40 is made from thermoplastic rubber (TPR). The TPR has high elasticity, high strength, and high resilience. Moreover, the TPR is non-toxic, odorless, and harmless, which meets environmental protection and hygiene requirements and is allowed to be used in products that directly contact the human body.

Figure 1:
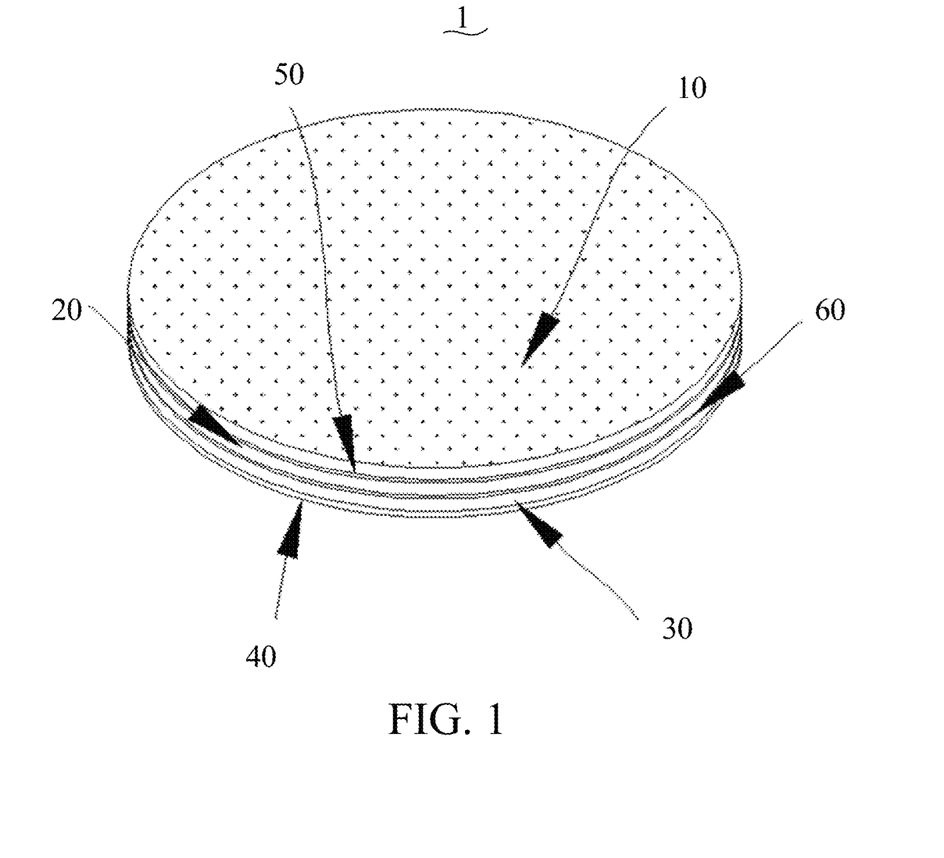
FIG. 1 is a schematic diagram of a carpet according to one embodiment of the present disclosure.
Figure 2:
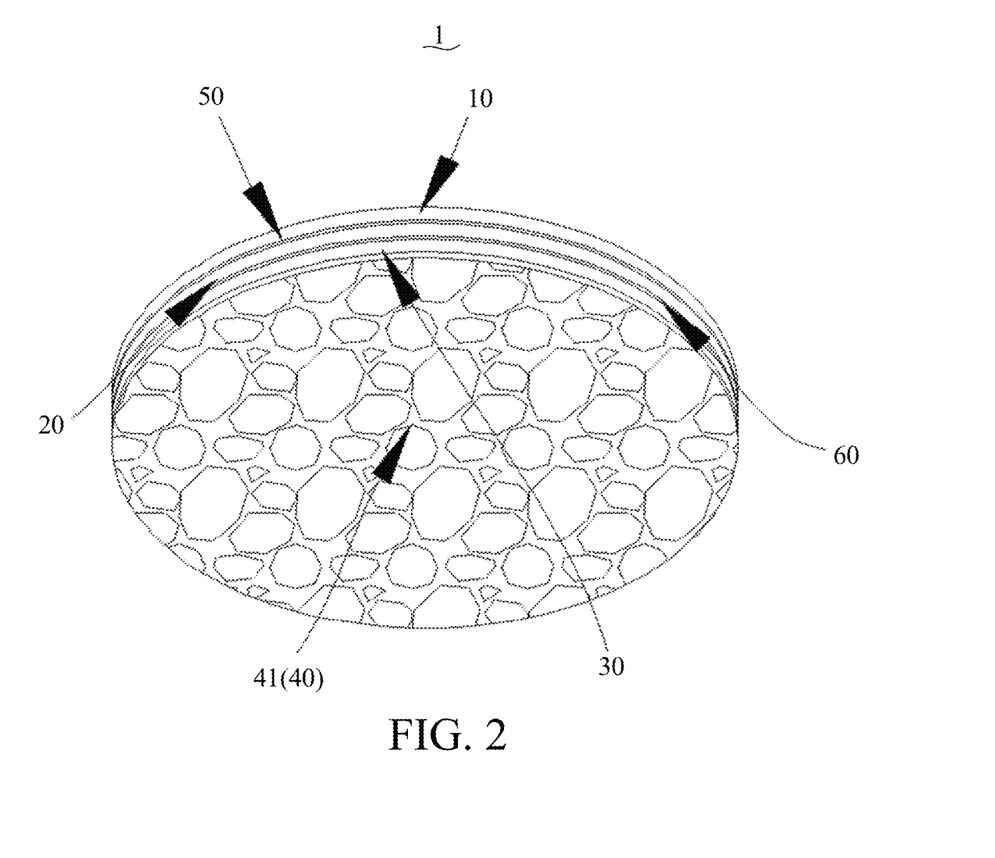
FIG. 2 is another schematic diagram of the carpet according to one embodiment of the present disclosure.

Furthermore, as shown in FIG. 2, an anti-slip pattern 41 is disposed on a bottom surface of the anti-slip rubber layer 40.

Figure 5:
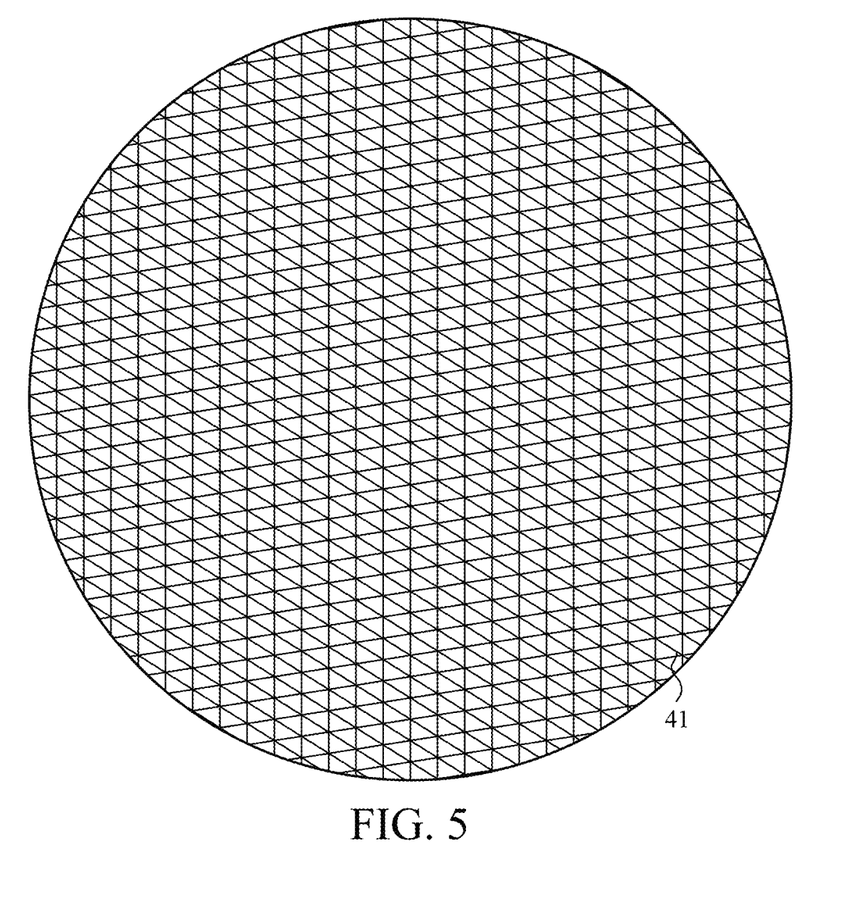
FIG. 5 is a schematic diagram of an anti-slip pattern according to one embodiment of the present disclosure.

In some embodiments, the anti-slip pattern 41 comprises any one or any combination of a triangular topological structure, a dot-shaped anti-slip pattern, a strip-shaped anti-slip pattern, a grid-shaped anti-slip patterns, a concave texture, and a convex texture. As shown in FIG. 5, basic units of the triangular topological structure are triangles, which form a triangle mesh by sharing edges and sharing vertices. It is understood that a triangle is the most stable shape of all polygons because three corners thereof disperse forces, making the triangle stable. In anti-slip texture designs, stability of the triangles helps ensure that an anti-slip effect is maintained even under uneven forces or complex environments. Further, the edges and the vertices of the triangles provide more contact points, which create more microscopic "meshing points" with the floor and significantly increase the friction force.

The dot-shaped anti-slip pattern 41 is composed of dense small dots or protrusions disposed at the bottom surface of the anti-slip rubber layer 40. The dense small dots or protrusions increase a contact area between the carpet 1 and the floor, improve the friction force, and achieve an anti-slip effect. The strip-shaped anti-slip pattern 41 is different from the dot-shaped anti-slip pattern 41. The strip-shaped anti-slip pattern 41 is composed of long strip-shaped protrusions. The long strip-shaped protrusions are disposed crosswise along a certain direction of the carpet 1 to provide stronger friction force and prevent the carpet 1 from sliding when subjected to the external forces. The grid-shaped anti-slip pattern 41 increases the friction force by forming dense grid structures of protrusions at the bottom surface of the carpet 1. The grid-shaped anti-slip pattern 41 not only has a good anti-slip effect, but also provides a certain elasticity, so that the carpet 1 fits the floor better. The concave texture and the convex texture are random, regular, or have a specific pattern of protrusions and grooves. The concave texture and the convex texture increase contact points between the carpet 1 and the floor, thereby improving the anti-slip performance and providing the carpet 1 a unique visual effect.

In some embodiments, the thickness of the anti-slip rubber layer 40 is not less than 2 mm and not greater than 5 mm. For example, the thickness of the anti-slip rubber layer 40 may be designed to be 2 mm, 3 mm, 4 mm, or 5 mm. Within a thickness range of 2 mm-5 mm, the anti-slip rubber layer 40 is enabled to have good wear resistance and withstand long-term use and wear. When subjected to impact or pressure, the anti-slip rubber layer 40 is not easily damaged or deformed. In addition, a thickness design of the anti-slip rubber layer 40 facilitates a formation of anti-slip patterns 41 at the bottom surface of the anti-slip rubber layer 40 to maintain a stable anti-slip effect. Further, the thickness design of the anti-slip rubber layer 40 enables the anti-slip rubber layer 40 to play a certain buffering role, reduce the impact when users walk or exercise thereon, and improve comfort. If the thickness of the anti-slip rubber layer 40 is less than 2 mm, the anti-slip rubber layer 40 is not conducive to the formation of anti-slip patterns 41 and is easily worn.

Figure 6:
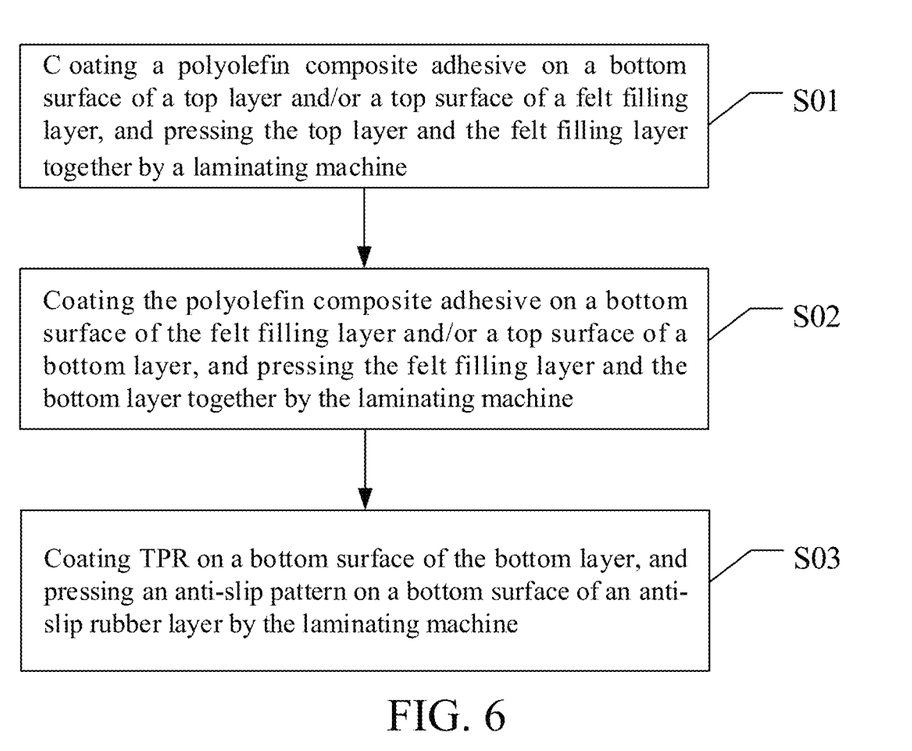
FIG. 6 is a flow chart of a manufacturing method of the carpet according to a first embodiment of the present disclosure.

As shown in FIG. 6, embodiments of the present disclosure further provide a manufacturing method of a carpet. The manufacturing method comprises steps S01-S03.

The step S01 comprises coating a polyolefin composite adhesive on a bottom surface of a top layer and/or a top surface of a felt filling layer, and pressing the top layer and the felt filling layer together by a laminating machine.

The step S02 comprises coating the polyolefin composite adhesive on a bottom surface of the felt filling layer and/or a top surface of a bottom layer, and pressing the felt filling layer and the bottom layer together by the laminating machine.

The step S03 comprises coating TPR on a bottom surface of the bottom layer, and pressing an anti-slip pattern on a bottom surface of an anti-slip rubber layer by the laminating machine.

In a second aspect, the present disclosure provides a manufacturing method of a carpet. The carpet comprises a top layer, a felt filling layer, a bottom layer, and an anti-slip adhesive layer. The manufacturing method comprises steps:
coating a polyolefin composite adhesive on a bottom surface of the top layer and/or a top surface of the felt filling layer, and pressing the top layer and the felt filling layer together by a laminating machine;
coating the polyolefin composite adhesive on a bottom surface of the felt filling layer and/or a top surface of the bottom layer, and pressing the felt filling layer and the bottom layer together by the laminating machine; and
coating TPR on a bottom surface of the bottom layer, and pressing an anti-slip pattern on a bottom surface of the anti-slip rubber layer by the laminating machine.

The felt filling layer is connected to the bottom surface of the top layer. The bottom layer is connected to the bottom surface of the felt filling layer. The anti-slip rubber layer is connected to the bottom surface of the bottom layer.

In some embodiments, a pattern layer is formed on an upper surface of the top layer by thermal transfer printing.

In some embodiments, the top layer and the bottom layer are overlocked to fix the felt filling layer between the top layer and the bottom layer.

In some embodiments, in the step S01 of coating the polyolefin composite adhesive on the bottom surface of the top layer and/or the top surface of the felt filling layer, when the polyolefin composite adhesive is only coated on the bottom surface of the top layer, a first adhesive amount thereof is not less than 30 g/m² (gram/square meter) and not greater than 50 g/m², when the polyolefin composite adhesive is only coated on the top surface of the felt filling layer, the first adhesive amount thereof is not less than 30 g/m² (gram/square meter) and not greater than 50 g/m², and when the polyolefin composite adhesive is coated on both of the bottom surface of the top layer and the top surface of the felt filling layer, a second adhesive amount thereof is not less than 15 g/m² and not greater than 25 g/m². Optionally, the first adhesive amount is 30 g/m², 40 g/m², or 30 g/m². Optionally, the second adhesive amount is 15 g/m², 20 g/m², or 25 g/m².

In the step S02 of coating the polyolefin composite adhesive on the bottom surface of the felt filling layer and/or the top surface of the bottom layer, when the polyolefin composite adhesive is only coated on the bottom surface of the felt filling layer, a third adhesive amount thereof is not less than 30 g/m² and not greater than 50 g/m²; when the polyolefin composite adhesive is only coated on the top surface of the bottom layer, the third adhesive amount thereof is not less than 30 g/m² and not greater than 50 g/m²; and when the polyolefin composite adhesive is coated on both of the bottom surface of the felt filling layer or the top surface of the bottom layer, a fourth adhesive amount thereof is not less than 15 g/m² and not greater than 25 g/m². Optionally, the third adhesive amount is 30 g/m², 40 g/m², or 30 g/m². Optionally, the fourth adhesive amount is 15 g/m², 20 g/m², or 25 g/m².

Furthermore, after the polyolefin composite adhesive is cured, a first adhesive layer is formed between the top layer 10 and the felt filling layer 20, and a second adhesive layer is formed between the felt filling layer 20 and the bottom layer 30. In the present disclosure, the adhesive amounts are controlled, so that a thickness of the first adhesive layer and a thickness of the second adhesive layer are controlled to be not less than 2 mm and not greater than 5 mm, and the thickness of the first adhesive layer and the thickness of the second adhesive layer may be 2 mm, 3 mm or 5 mm. In this way, the bonding strengths of the first adhesive layer and the second adhesive layer are effectively ensured, and layers of the carpet 1 are prevented from separating from each other. In addition, the softness of the carpet 1 is further ensured to meet the requirements of being easily folded and washed.

Figure 7:
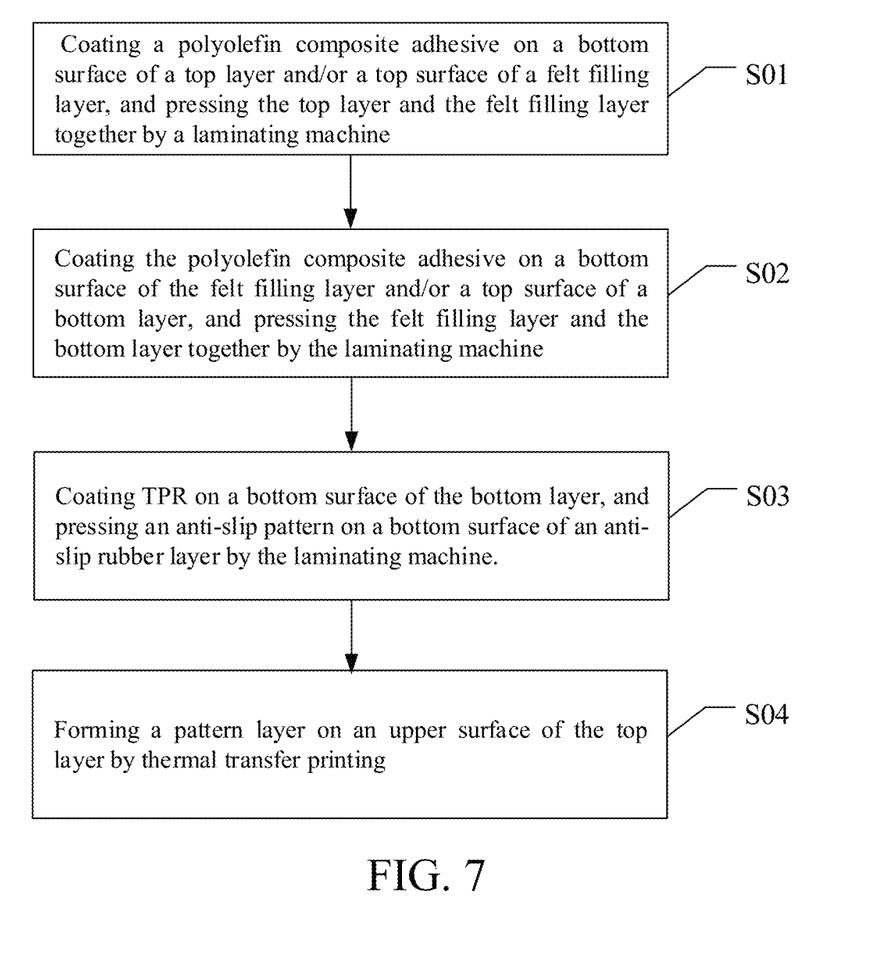
FIG. 7 is a flow chart of the manufacturing method of the carpet according to a second embodiment of the present disclosure.

As shown in FIG. 7, the manufacturing method further comprises a step S04.

The step S04 comprises forming a pattern layer on an upper surface of the top layer by thermal transfer printing.

An appropriate thermal transfer paper or thermal transfer film is selected in advance, and then a thermal transfer pattern (i.e., the at least one pattern mentioned above) to be printed is designed and made on the thermal transfer paper or the thermal transfer film. The thermal transfer pattern may be text, image, or a combination of the text and the image. Then, an appropriate printing method (such as gravure printing, letterpress printing, lithography, or screen printing) is adopted to print the thermal transfer pattern on the thermal transfer paper or the thermal transfer film. Optionally, the gravure printing is adopted. Printed images and texts printed by gravure printing are fine and clear, with a strong sense of three-dimensionality and texture.

When performing thermal transfer, the thermal transfer paper or the thermal transfer film printed with the thermal transfer pattern is tightly attached to the top layer 10 to ensure that the thermal transfer pattern completely corresponds to the upper surface of the top layer 10. Then a thermal transfer machine is adopted to heat and pressurize the thermal transfer paper or the thermal transfer film. Specifically, a heating temperature is controlled between 180° C. to 220° C., and a heating time is determined according to the thermal transfer pattern. During a heating and pressurizing process, the thermal transfer pattern on the thermal transfer paper or the thermal transfer film gradually sublimates or melts, and penetrates into the upper surface of the top layer 10 to form the pattern layer that is firm. After the heating and pressurizing process is completed, the thermal transfer paper or the thermal transfer film is peeled off from the top layer 10. At this time, the thermal transfer pattern on the thermal transfer paper or the thermal transfer film is successfully transferred to the upper surface of the top layer 10.

Figure 8:
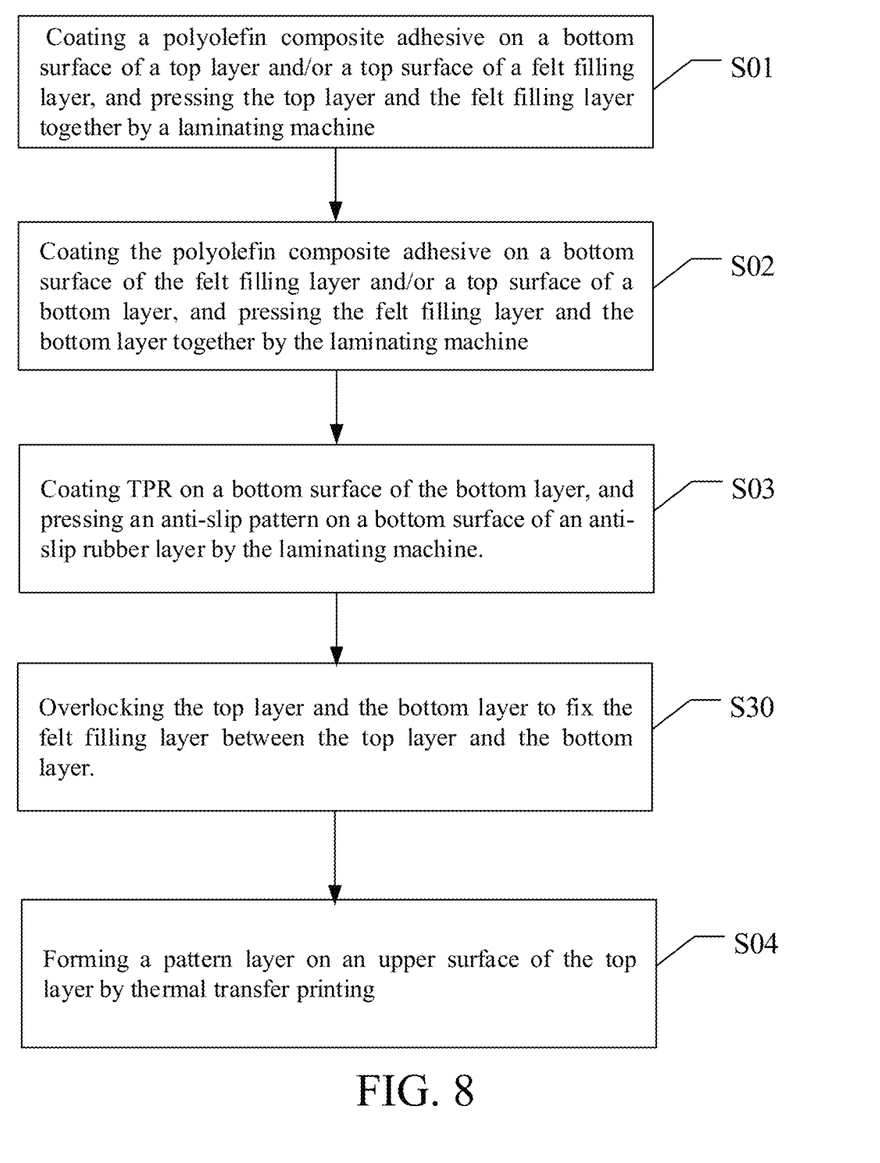
FIG. 8 is a flow chart of the manufacturing method of the carpet according to a third embodiment of the present disclosure.

As shown in FIG. 8, the manufacturing method further comprises a step S30.

The step S30 comprises overlocking the top layer and the bottom layer to fix the felt filling layer between the top layer and the bottom layer.

After the top layer 10, the felt filling layer 20, and the bottom layer 30 are bonded together by the polyolefin composite adhesive, a sewing machine is used to sew along edges of the top layer 10 and the bottom layer 30. Different sewing styles and techniques is selected according to specific design requirements, such as straight stitching, zigzag stitching, or curved stitching, etc., to increase the firmness and aesthetics of the sewing. After the top layer 10 and the bottom layer 30 are overlocked and sewn, the anti-slip layer 40 is processed on the bottom layer 30.

In the drawings of the embodiments, the same or similar numbers correspond to the same or similar components; in the description of the present disclosure, it should be understood that terms such as "upper", "lower", "left", "right", etc., indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A carpet, comprising:
a top layer;
a felt filling layer connected to a bottom surface of the top layer;
a bottom layer connected to a bottom surface of the felt filling layer; and
an anti-slip rubber layer connected to a bottom surface of the bottom layer;
wherein pores of the top layer are not greater than 2 mm, and liquid is capable of slowly entering the top layer after 30-60 seconds, the anti-slip rubber layer is configured to directly contact a ground on which the carpet is placed, the top layer is disposed away from the ground, and the upper surface of the top layer is configured to be exposed to an environment;
wherein the top layer, the felt filling layer, and the bottom layer are bonded together by an adhesive, and an edge of the top layer is connected to an edge of the bottom layer by sewing to fix the felt filling layer between the top layer and the bottom layer.

2. The carpet according to claim 1, wherein a pattern layer is disposed on the top layer, and the pattern layer is formed on an upper surface of the top layer by thermal transfer printing; the top layer is made of any one or combination of polyester, polypropylene, chinlon, and acrylic fiber.

3. The carpet according to claim 1, wherein
the felt filling layer is made from any one or any combination of wool, rabbit hair, horse hair, camel hair, chemical fiber, artificial felt, plant fiber, and animal leather felt; and/or
the bottom layer is made from any one of a blended chemical fiber fabric, cotton, and a chemical fiber fabric.

4. The carpet according to claim 1, wherein the carpet further comprises a first adhesive layer disposed between the top layer and the felt filling layer, and the first adhesive layer is configured to bond the top layer and the felt filling layer.

5. The carpet according to claim 4, wherein pores of the bottom layer are not greater than 2 mm.

6. The carpet according to claim 4, wherein the carpet further comprises a second adhesive layer disposed between the felt filling layer and the bottom layer, and the second adhesive layer is configured to bond the top layer and the felt filling layer.

7. The carpet according to claim 6, wherein at least one of the first adhesive layer and the second adhesive layer is polyolefin composite adhesive.

8. The carpet according to claim 6, wherein a thickness of the first adhesive layer and/or a thickness of the second adhesive layer is not less than 2 mm and not greater than 5 mm.

9. The carpet according to claim 1, wherein the anti-slip rubber layer is made from thermoplastic rubber (TPR).

10. The carpet according to claim 8, wherein an anti-slip pattern is disposed on a bottom surface of the anti-slip rubber layer.

11. The carpet according to claim 10, wherein the anti-slip pattern comprises any one or any combination of a triangular topological structure, a dot-shaped anti-slip pattern, a strip-shaped anti-slip pattern, a grid-shaped anti-slip patterns, a concave texture, and a convex texture.

12. The carpet according to claim 8, wherein a thickness of the anti-slip rubber layer is not less than 2 mm and not greater than 5 mm.

13. The carpet according to claim 1, wherein the top layer is made of modified polyester; the modified polyester is polyester copolymerized with at least one monomer, and the at least one monomer is isophthalic acid or sulfonate monomer, or a combination of isophthalic acid and sulfonate monomer;
the felt filling layer is made of a non-woven felt; and
the bottom layer is made from any one of a blended chemical fiber fabric, cotton, and a chemical fiber fabric;
the anti-slip rubber layer is made from thermoplastic rubber, and an anti-slip pattern is disposed on a bottom surface of the anti-slip rubber layer and is configured to directly contact the ground.

* * * * *